Feb. 16, 1932.                C. T. CUNNIUS                1,845,864
                                HEADLIGHT
                          Filed Dec. 19, 1930          2 Sheets-Sheet 1
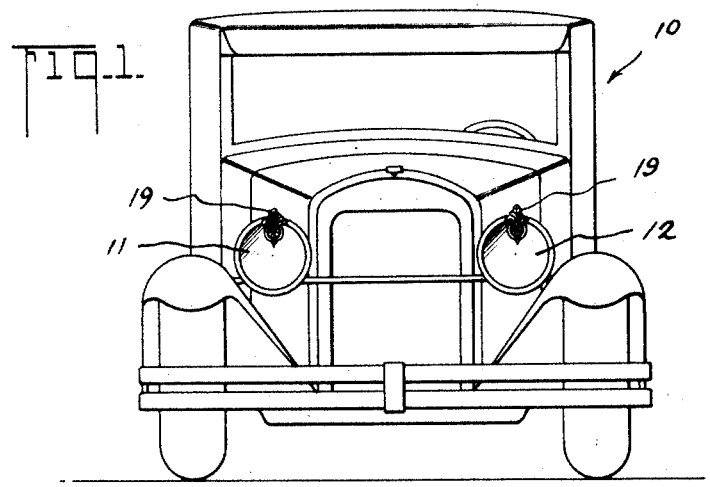
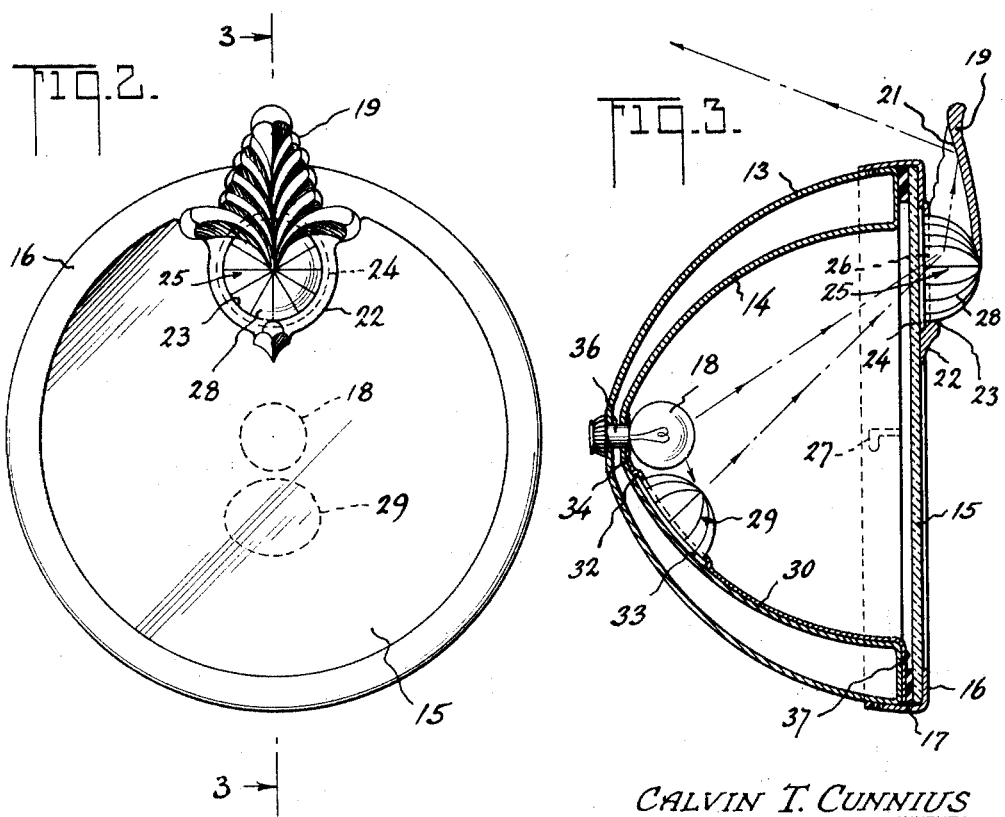
CALVIN T. CUNNIUS
        INVENTOR
BY  Victor J. Evans
              ATTORNEY Feb. 16, 1932.   C. T. CUNNIUS   1,845,864
HEADLIGHT
Filed Dec. 19, 1930   2 Sheets-Sheet 2
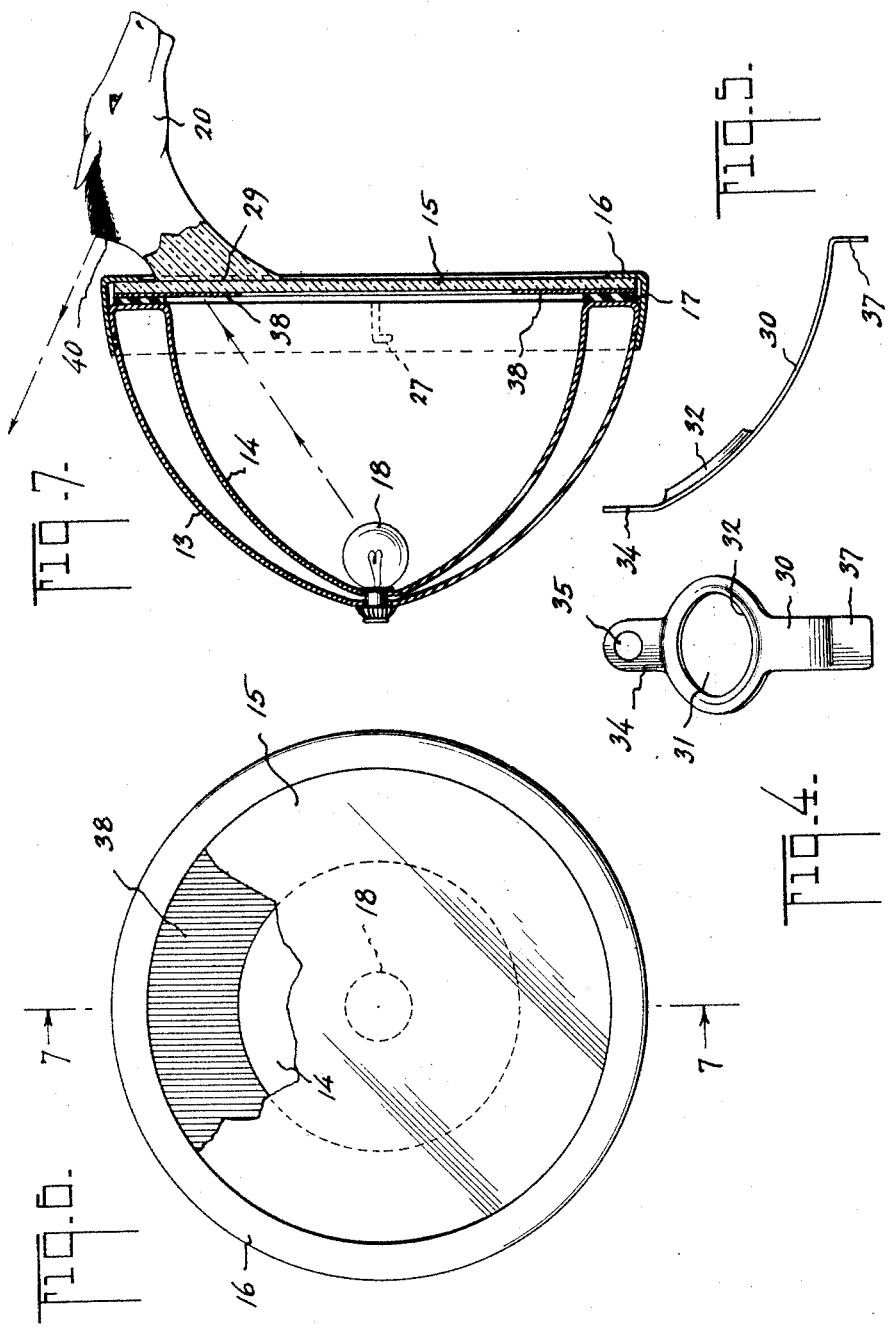
CALVIN T. CUNNIUS
INVENTOR
BY Victor J. Evans
ATTORNEY Patented Feb. 16, 1932

1,845,864

UNITED STATES PATENT OFFICE

CALVIN T. CUNNIUS, OF NEW BRUNSWICK, NEW JERSEY, ASSIGNOR TO AUTOMOTIVE DEVICES CORPORATION, OF NEW BRUNSWICK, NEW JERSEY, A CORPORATION OF NEW JERSEY

HEADLIGHT

Application filed December 19, 1930. Serial No. 503,579.

This invention relates to headlamps for motor vehicles and aims particularly to improve the operation of the headlamps so that the operator of the vehicle may have visible evidence of the existence of illumination without leaving his seat and so that the driver of an approaching vehicle will be enabled to determine which headlamp is in operation if one of the headlamps happens to be out, so that the approaching driver may properly judge the distance necessary to allow to avoid collision.

Another object of the invention is to provide a simple and efficient attachment for headlamps of existing types, whereby a portion of the illumination from the lamp may be reflected back toward the driver's seat so that the driver may receive immediate warning if a lamp should be extinguished.

Yet another object is to equip the headlamp with a supplementary reflector adapted to direct a colored beam from the front of the headlamps; to warn the driver of an approaching car as to which headlamp is burning, if one has been extinguished.

Other objects and advantages of the invention will be hereinafter specifically pointed out, or will become apparent, as the specification proceeds.

With the above indicated objects in view, the invention resides in certain novel constructions and combinations and arrangement of parts, clearly described in the following specification and fully illustrated in the accompanying drawings, which latter shows embodiments of the invention as at present preferred.

In said drawings:

Fig. 1 is a front view of a motor vehicle equipped with one form of the present invention;

Fig. 2 is a front elevation of a headlamp with the present improvements applied thereto;

Fig. 3 is a vertical sectional view through the headlamp shown in Fig. 2, on the line 3—3 of said figure;

Fig. 4 is a front elevation of the supplementary reflector supporting bracket;

Fig. 5 is a side view of the bracket shown in Fig. 4;

Fig. 6 is a front view of a headlamp illustrating another embodiment of the construction; and Fig. 7 is a vertical sectional view taken on the line 7—7 of Fig. 6.

Referring more particularly to the drawings, the invention is here shown applied to a motor vehicle 10 having a pair of headlights 11 and 12 at left and right hand sides respectively.

Each headlight 11 and 12 is of conventional form and includes a housing 13, a concave reflector 14 and a lens 15. The usual rim 16 secures the lens in place, an annular gasket 17 being provided between the inner side of the lens 15 and the front end of the casing 13. Each headlight also includes the usual electric light bulb 18.

To enable the operator to determine when each lamp is alight and also to enable an approaching driver or other person to perceive the same, I provide means associated with the bulb 18 whereby a portion of the illumination is reflected rearwardly to act as a warning while another part of the illumination, separate from the usual headlight illumination, is employed to direct a colored beam forwardly. To this end the present invention includes the provision of a supplementary light indicator 19 which may be formed as any suitable ornament as seen in Figs. 1 to 3, or as a figure 20 as seen in Fig. 7. The light indicator 19 is in this instance formed of an upwardly extending hollow casing which may be of metal or other material, positioned in front of the lens 15, the under surface 21 of this hollow casing being adapted to act as a reflecting surface to receive a portion of the illumination from the lamp bulb 18, through the lens 15, so that the reflected illumination is visible above the lamp housing 13.

To secure the light indicator 19 in place, the same is in this instance formed as an integral part of the rim 16; though the indicator may be separate from the rim and secured thereto by a suitable bracket or otherwise. The indicator 19 here includes a substantially circular lower portion 22 having an opening 23, an annular recess 24 being provided at the inner side of the indicator portion 22. A button 25, formed preferably of colored glass or other translucent material, is positioned within the opening 23, this button 25 having a circular flange portion 26 at its base by which the button is held in place within the annular recessed portion 24 and retained in such position by engagement with the surface of the lens 15. The button 25 is inserted in the opening 23 before the rim 16 is secured in place over the lens; and the rim 16 may be held in position by the usual bayonet joint 27, or otherwise.

The button 25 receives a portion of the illumination from the lamp bulb 18, and performs a dual function of refracting a colored beam to the reflecting surface 21, which colored beam is visible to the vehicle operator; and at the same time, the illumination of the lower part 28 of the button 25 is visible at the front of the headlight. Differently colored buttons are employed for the two headlights, such as the conventional colors red and green, so that the driver of an approaching vehicle, or an approaching pedestrian, can readily determine which of the headlights may be out, and thereby allow the proper distance for passage of the vehicle.

As a further development I provide a supplementary light refracting button 29 adjacent to the lamp bulb 18, this supplementary button 29 being adapted to refract a colored beam to the button 25, which latter in this instance may be of glass or any translucent material, so that the colored beam will be reflected rearwardly as already described. Or, the button 25 may be dispensed with and the upwardly extending casing 19 constructed with a reflecting surface which is continuous throughout the inner surface of the casing; it being understood that the open portion 23 may be, in this case, absent.

In any event, the illumination refracted by the supplementary button 29 will be visible through the lens 15 at the front of the vehicle; and I have discovered that this manner of refraction includes certain peculiar optical advantages in that it does not impair the white or yellow illumination from the lamp bulb 18 which is directed in a beam forwardly by the reflector 14 and is not visible at the front of the vehicle until the approaching vehicle or pedestrian is relatively close to the vehicle, and yet far enough away to act appropriately when it is perceived that one or the other of the headlights is not functioning.

To support the supplementary button 29 in position upon the reflector 14 I provide an elongated bracket 30 which includes an open portion 31 provided with an annular recessed portion 32 to receive the circular flanged portion 33 of the button 29. The bracket 30 also has a rearward extension 34 having a hole 35 through which the base 36 of the light bulb 18 is inserted, thereby holding the button 29 in place upon the reflector 14. The front end 37 of the bracket 30 is preferably bent down around the forward end of the reflector 14 and housing 13 and is held in place by the lens and rim, as clearly seen in Fig. 3.

As a still further development of the present invention, I provide for supplementary colored illumination by means of an annular disk 38 of colored material provided at the inner side of the lens 15. This supplementary colored disc 38 may be of any desired translucent material such as colored glass, celluloid and the like either separate from the lens or fused to or otherwise secured at the lens; or it may be painted on the back of the lens.

In this latter instance, as seen in Fig. 7, the colored illumination directed through the annular colored portion 38 may also be rendered visible rearwardly to act as a warning to the driver by providing a translucent body as seen at 20, upon the upper part of the headlight, this body 20 being desirably hollow, the upper portion of the body being slightly higher than the top of the headlight rim 16, as seen at 40 so that the body 20, when illuminated, will be visible to the driver as well as at the front of the vehicle. The body 20 may consist of a figure or ornament of any desired shape, and may be fused to or formed as an integral part of the lens 15, or it may be separate from the lens and secured in place by a suitable bracket.

The figure 20 may be omitted, if desired, as seen in Fig. 6.

What I claim is:

The combination with a vehicle headlight and the like having a lamp bulb, lens, inner reflector, housing and securing rim, of supplementary illuminating equipment including a light indicating body at the upper part of the headlight rim at the outer side of said lens, said body comprising a casing having an open lower portion and an upwardly extending rearwardly visible reflecting portion, said open lower portion having an annular recess, a colored light refracting button extending forwardly from said open lower portion, said button including a flange portion seating in said annular recess and disposed against the outer surface of the lens, said button adapted to receive light rays from said lamp bulb and adapted to direct said received rays to said reflecting portion and also forwardly of the vehicle, a second colored light refracting button adjacent to said lamp bulb, adapted to direct colored light rays forwardly of said lens and also to said first named button, and a bracket to support said second button in position upon said inner reflector, said second button including a flange portion and said bracket including a recessed portion to receive the flange of said second button, said bracket having a rearward extension to surround the base portion of said lamp bulb and a forwardly extending portion adapted to be clamped in place at the front of said inner reflector and housing behind said lens and rim.

In testimony whereof I hereby affix my signature.

CALVIN T. CUNNIUS.